May 24, 1932.    G. R. CUNNINGTON    1,859,656
NONSKID CROSS LINK FOR TIRE CHAINS
Filed Sept. 27, 1927    2 Sheets-Sheet 1
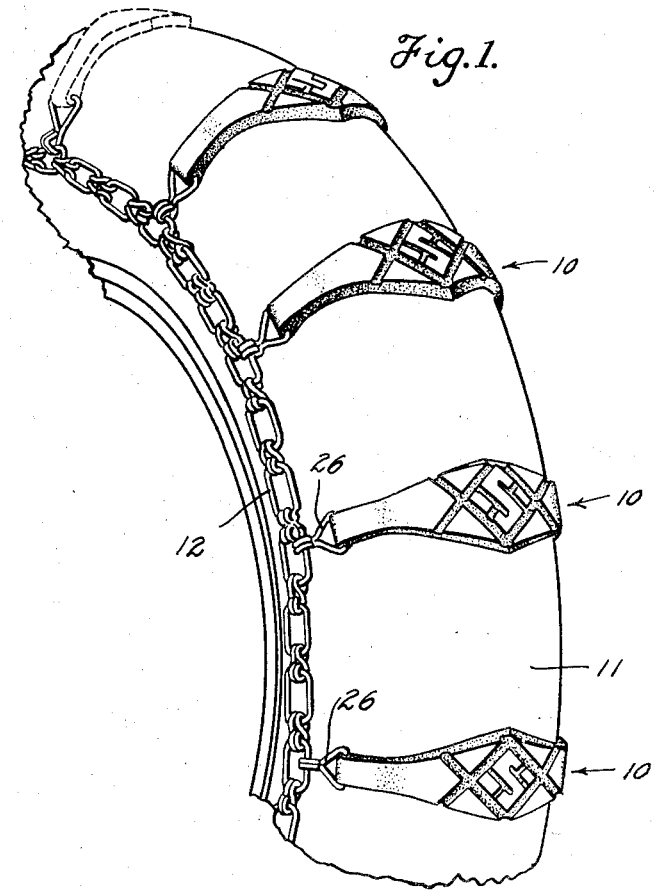
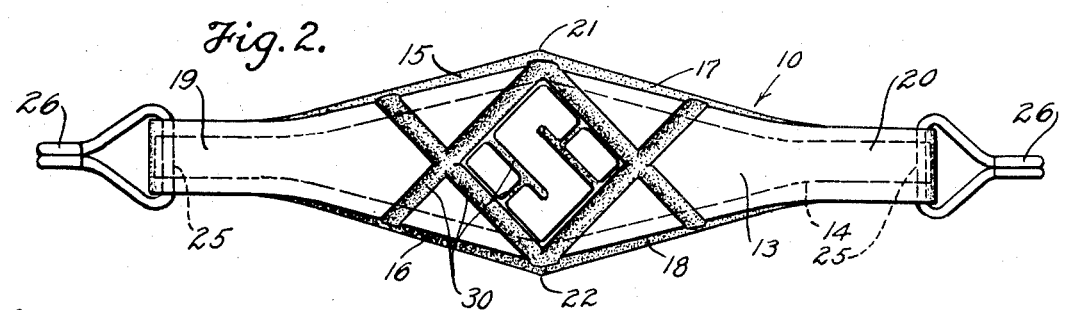
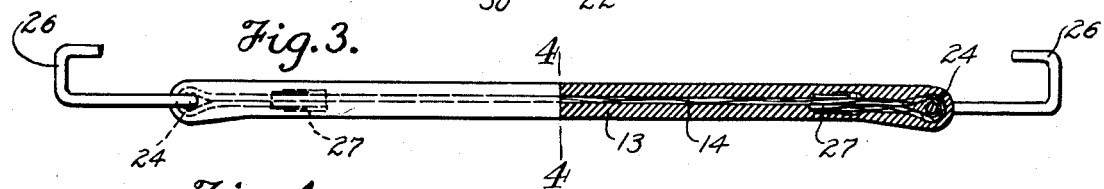
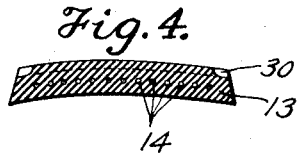
INVENTOR.
George R. Cunnington
BY
Rogers, Kennedy & Campbell
ATTORNEYS May 24, 1932.                G. R. CUNNINGTON                1,859,656
                       NONSKID CROSS LINK FOR TIRE CHAINS
                         Filed Sept. 27, 1927        2 Sheets-Sheet 2
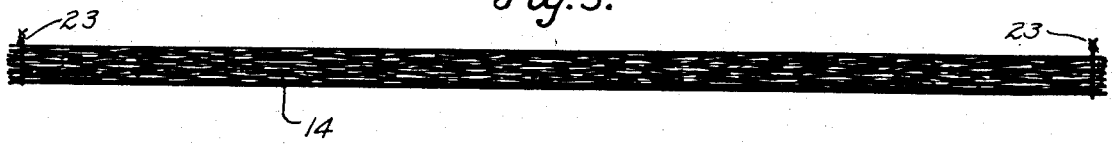
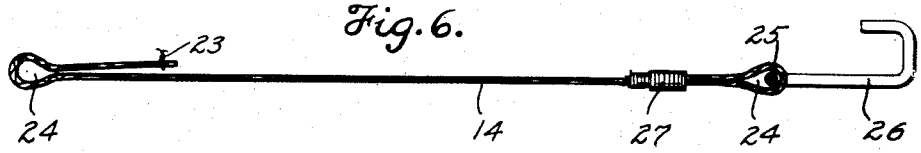
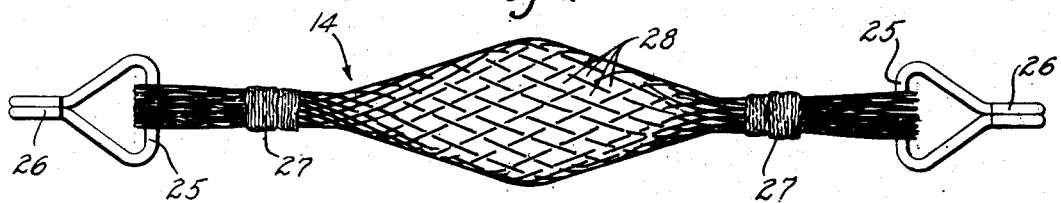
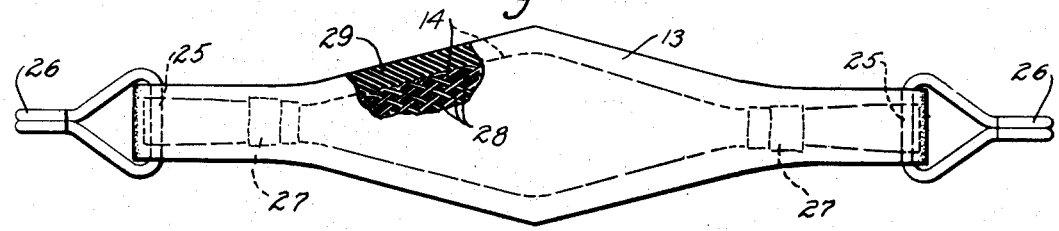
INVENTOR.
BY George R. Cunnington
Rogers Kennedy Campbell
ATTORNEYS Patented May 24, 1932

1,859,656

UNITED STATES PATENT OFFICE

GEORGE R. CUNNINGTON, OF AKRON, OHIO, ASSIGNOR, BY MESNE ASSIGNMENTS, TO THE GENERAL TIRE & RUBBER COMPANY, OF AKRON, OHIO, A CORPORATION OF OHIO

NONSKID CROSS LINK FOR TIRE CHAINS

Application filed September 27, 1927. Serial No. 222,240.

This invention relates to non-skid links, and refers particularly to transverse links or bands of detachable non-skid chains used in conjunction with automobile tires.

An important object of the invention, in its broader aspects, is the provision of a non-skid link which will be less noisy in use, less likely to injure the tire, and having better wearing qualities than the link chains and similar devices of the prior art. To accomplish this object, the improved link is formed of a body of rubber having a flexible metallic reinforcement extending longitudinally therethrough, said reinforcement being preferably formed of braided wire such as is used in the formation of pneumatic tire beads.

One feature of the invention resides in making the rubber body of substantially diamond shape, with the major axis disposed transversely on the tire, whereby to present increased wearing surface for road contact, which feature also renders the links smoother in action than straight-side links, as will hereinafter be pointed out.

Another feature of the invention resides in forming the link with a transverse curvature of a radius less than that of the tire, with the result that the link will fit snugly against the periphery of the tire when in use. This reduces chafing between the mutually engaging surfaces and, furthermore, prevents twisting of the link on the tire.

A further feature of the invention resides in the firm anchorage of the rubber body to the metallic reinforcement, and the disposition of the parts in such manner as to have the load taken primarily by said reinforcement. To this end, the braided wire is expanded intermediate its ends, forming diamond shaped interstices into which the rubber flows during vulcanization, and effecting a firm interlock. Furthermore, the end portions of the braided wire are reversely bent to form loops for the reception and retention of chain attaching hooks or similar elements, said closed loops being also embedded in the rubber and permanently closed.

Still another feature of the invention resides in the method of producing the improved links, said method rendering the manufacture possible with a minimum amount of labor and at low cost.

The foregoing and other objects, features, and advantages will be readily apparent from the following description in connection with the accompanying drawings, wherein a preferred embodiment of the invention is shown by way of illustration, and wherein Fig. 1 is a fragmentary perspective view of an automobile tire equipped with non-skid links embodying the invention;

Fig. 2 is a top plan view of one of the improved links per se in flat condition;

Fig. 3 is an edge view partly in section of the same;

Fig. 4 is a vertical transverse sectional view on line 4—4 of Fig. 3;

Fig. 5 is a plan view of a length of braided wire used in forming the reinforcing member of the link;

Fig. 6 is an edge view thereof showing said reinforcement partly formed;

Fig. 7 is a plan view of the same after being expanded and ready for assembly with the gum stock; and Fig. 8 is a plan view, partly in section, showing the reinforcement and the gum stock assembled together, ready for the vulcanizing operation.

Referring now to the drawings in detail, the improved non-skid links 10 are shown in Fig. 1 as mounted for use on an automobile tire 11, said links extending transversely across the tread of the tire at spaced intervals and being connected at their opposite ends to chains 12 (only one of which is shown) which extend around the sides of the tire in the usual manner. As all of the links 10 are alike in structure, a detailed description of only one of them will be given.

As best shown in Figs. 2 to 8 inclusive, each link 10 comprises a body 13 of yieldable rubber, suitably vulcanized, with an embedded flexible metallic core 14 extending longitudinally therein to reinforce the rubber body and to bear the load between the side chains 12. The rubber body 13 is of greatest width at its center and is characterized by side edge portions 15, 16, 17 and 18 converging from the center toward the opposite ends 19 and 20, which latter for a short distance may have straight parallel side edges. The said side edges 15, 16, 17, and 18 are inclined with reference to the surfaces of the link at their points of intersection 21 and 22, and the planes of said edges gradually vary from such inclination to perpendicular, merging with the side edges of the end portions 19 and 20.

The metallic core 14 is preferably formed of braided wire and is interlocked with the rubber in such manner as to prevent relative longitudinal movement and stretching. Such braided wire is cut to desired length as shown in Fig. 5, and has its extremities wrapped with pieces of wire 23 to prevent unravelling of the component strands of the braid, and thereafter the end portions of the braid are reversely bent to form loops 24. Bar portions 25 of hook members 26 or other suitable chain attaching means are then disposed in said loops 24, after which the wire-bound extremities of the braid are fastened to the overlapped portions of the body by a wrapping of adhesive tape 27 or the like. In this manner, the loops 24 are permanently closed, with the attaching hooks 26 in place, prior to the assembly of the core with the gum stock. The next operation involves expanding the braid intermediate its ends as shown in Fig. 7, which gives the core the same general outline as the rubber body and opens up the interstices 28 in diamond shape.

The complete core 14 of Fig. 7 is next covered on both sides with suitable gum stock 29 in unvulcanized condition, as shown in Fig. 8, said gum stock being of a greater width than the core 14 so as to overlap the edges thereof and passing around the loops 24 as well as the opposite surfaces of the braided wire. The application of said gum stock may be effected in any desired manner obvious to those skilled in the art, and the entire assemblage is then placed in a suitable mold wherein the gum stock will be subjected to heat and pressure to effect vulcanization. In this operation, the rubber is caused to flow into the interstices of the braided wire core and to become firmly interlocked therewith, and furthermore said vulcanizing imparts the desired finish and shape to the rubber body. In shaping the rubber body, the mold will also be made to impart to its inner surface a curvature of a radius slightly less than the radius of the tire with which it is intended to be used (see Fig. 4) and furthermore the upper or outer surface of the rubber will be formed with a suitable non-skid design which, in the drawings, has been shown as comprising a plurality of intersecting surface grooves 30, but which of course may be of any other desired type or configuration.

From the foregoing, it will be evident that the flexible metallic core extends from end to end in the link body 13 and being entirely embedded in the rubber is thoroughly protected from the action of air and moisture. When the device is in use, the load on the rubber will be taken by said core 14, because of the permanent loops 24 in the ends of said core. While the link has been shown in Figs. 2 and 3 in substantially flat condition, it is of course to be understood that when in use said links are curved longitudinally to correspond with the shape of the tire 11, and since the radius of such curvature is less than the radius of transverse curvature, it will be evident that the tire engaging the side of said link will be toroidal in character. This arrangement causes the links to fit the periphery of the tire much more snugly than is the case with an ordinary flat link, and in view of such snug fitting, the improved links are more firmly held against twisting when in use.

It is to be noticed that the widest portion of the link is presented to the road at the center of the tread, giving maximum wearing service where most needed and rendering the device smoother in operation, as above mentioned. This smoothness of operation results from the diamond shape of the links 10, and is explained by the fact that, as the wheel rotates, either the point 21 or 22 first contacts the road with considerable yieldability and, as rotation continues, the wheel rides more or less gradually up on the body of the link with the rubber offering increasing resistance due to the angularity of the edges 15, 16, 17 and 18. The gum stock used in the production of the link body 13 can of course be specially compounded for high wearing qualities, and in view of the fact that displacement or distortion of the rubber body is resisted by the braided cord 14, the improved link will have a comparatively long life. Furthermore, such devices as contemplated by this invention will be comparatively noiseless in operation and practically incapable of damaging the tire upon which they are mounted.

The reinforced link herein disclosed is broadly claimed in my co-pending application Serial No. 427,615, filed February 11, 1930.

The invention is susceptible of numerous modifications in the details of construction, arrangement of parts, and in the steps of the method of producing the improved link, and the right is herein reserved to make such changes as fall within the scope of the appended claims without departing from the spirit of the invention.

Having thus described my invention, what I claim is:

1. In or for a vehicle tire chain, a non-skid link comprising a body of flexible rubber wider centrally, and flexible metallic wires therein, said body being molded to a transverse radius less than that of the tire to which it is to be applied.

2. A tire cross link comprising reinforcing means consisting of a plurality of strands gathered together at the ends of the link and diverging from the ends toward the center of the link, said strands being disposed in crossing relation and providing interstices of increasing size inwardly of the ends of the link, said gathered portions of the strands being looped at each end of the link, chain engaging hook members carried within the loops of said reinforcing means at each end of the link, binding means permanently securing said reinforcing means in looped position, and a body of rubber substantially completely enclosing the reinforcing means and said binding means.

In testimony whereof I have affixed my signature hereto.

GEORGE R. CUNNINGTON.